(12) United States Patent
Martines-Serna Villagran et al.

(10) Patent No.: US 6,432,465 B1
(45) Date of Patent: *Aug. 13, 2002

(54) DOUGH COMPOSITIONS USED TO PREPARE REDUCED AND LOW-CALORIE SNACKS

(75) Inventors: Maria Dolores Martines-Serna Villagran; Francisco Valentino Villagran, both of West Chester; David Arthur Lanner; Yen-Ping Chin Hsieh, both of Cincinnati, all of OH (US)

(73) Assignee: The Procter & Gamble Co., Cincinnati, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/886,630

(22) Filed: Jul. 1, 1997

Related U.S. Application Data

(60) Provisional application No. 60/020,934, filed on Jul. 1, 1996, and provisional application No. 60/020,937, filed on Jul. 1, 1996.

(51) Int. Cl.$^7$ ............................................. A21D 10/00
(52) U.S. Cl. ........................ 426/549; 426/94; 426/438; 426/439; 426/637; 426/808
(58) Field of Search ................................ 426/439, 549, 426/808, 94, 438, 637

(56) References Cited

U.S. PATENT DOCUMENTS

| | | | |
|---|---|---|---|
| 2,787,553 A | 4/1957 | Cordling et al. | 99/207 |
| 3,355,304 A | 11/1967 | Barnes et al. | 99/207 |
| 3,574,643 A | 4/1971 | Lewis | 99/207 |
| 3,594,187 A | 7/1971 | Leipa et al. | 99/100 |
| 3,597,227 A | 8/1971 | Murray et al. | 99/100 |
| 3,626,466 A | 12/1971 | Liepa | 107/15 |
| 3,917,866 A | 11/1975 | Purves et al. | 426/457 |
| 4,241,094 A | 12/1980 | O'Neil et al. | 426/324 |
| 4,560,569 A | 12/1985 | Ivers | 426/549 |
| 4,623,548 A | 11/1986 | Willard | 426/559 |
| 4,623,550 A | 11/1986 | Willard | 426/559 |
| 4,645,679 A | 2/1987 | Lee et al. | 426/560 |
| 4,668,519 A | 5/1987 | Dartey et al. | 426/548 |
| 4,678,672 A | 7/1987 | Dartey et al. | 426/19 |
| 4,698,230 A | 10/1987 | Miles | 426/533 |
| 4,769,253 A | 9/1988 | Willard | 426/559 |
| 4,770,891 A | 9/1988 | Willard | 426/559 |
| 4,781,937 A | 11/1988 | Knowles | 426/457 |
| 4,834,996 A | 5/1989 | Fazzolare et al. | 426/302 |
| 4,873,093 A | 10/1989 | Fazzolare et al. | 426/28 |
| 4,931,303 A | 6/1990 | Holm et al. | 426/549 |
| 4,970,084 A | 11/1990 | Pirotta et al. | 426/289 |
| 4,973,481 A | 11/1990 | Hunt et al. | 426/144 |
| 4,994,295 A | 2/1991 | Holm et al. | 426/549 |
| 5,085,884 A | 2/1992 | Young et al. | 426/611 |
| 5,093,146 A | 3/1992 | Calandro et al. | 426/619 |
| 5,104,673 A | 4/1992 | Fazzolare et al. | 426/549 |
| 5,171,600 A | 12/1992 | Young et al. | 426/550 |
| 5,188,859 A | 2/1993 | Lodge et al. | |
| 5,292,542 A | 3/1994 | Beck et al. | 426/285 |
| 5,340,598 A | 8/1994 | Hay, Jr. et al. | 426/496 |
| 5,366,749 A | 11/1994 | Frazee et al. | 426/549 |
| 5,405,625 A | 4/1995 | Biggs | 426/93 |
| 5,426,248 A | 6/1995 | Sarama et al. | 568/824 |
| 5,429,834 A | 7/1995 | Addesso et al. | 426/549 |
| 5,433,961 A | 7/1995 | Lanner et al. | 426/93 |
| 5,458,910 A | 10/1995 | Gruetzmacher et al. | 426/611 |
| 5,464,642 A | 11/1995 | Villagran et al. | 426/439 |
| 5,464,643 A | 11/1995 | Lodge | 426/439 |
| 5,500,240 A | 3/1996 | Addesso et al. | 426/560 |
| 5,514,387 A | 5/1996 | Zimmerman et al. | |
| 5,514,404 A | 5/1996 | Zimmerman et al. | 426/549 |
| 5,690,982 A | 11/1997 | Fazzolare et al. | 426/550 |
| 5,747,092 A | 5/1998 | Carey et al. | 426/560 |
| 5,922,386 A | 7/1999 | Reed et al. | 426/549 |
| 5,925,396 A | 7/1999 | Reed et al. | 426/549 |
| 5,928,700 A | 7/1999 | Zimmerman et al. | 426/549 |

FOREIGN PATENT DOCUMENTS

| | | |
|---|---|---|
| AU | 77546 75 A | 7/1976 |
| EP | 0418955 | 11/1990 |
| GB | 1194421 | 6/1970 |
| WO | WO 91/15964 | 10/1991 |
| WO | WO 93/00823 | 1/1993 |
| WO | WO 94/23591 | 10/1994 |
| WO | WO 96/01572 | 1/1996 |
| WO | 97/25880 | 7/1997 |
| WO | 98/00036 | 1/1998 |
| WO | 98/00037 | 1/1998 |

OTHER PUBLICATIONS

W.F. Talburt, O. Smith: "Potato Processing" 1975, AVI, USA XP002044656 pp. 467–469, 472–489.

The American Potato Journal; R. T. Whittenberger; "Changes in Specific Gravity; Starch Content, and Sloughing of Potatoes During Storage"; vol. 28; pp. 738–747.

The American Potato Journal; Personius et al.; "Adhesion of Potato–Tuber Cells as Influenced by Temperature"; Jan. 26, 1938; pp. 513–524.

*Primary Examiner*—Lien Tran
(74) *Attorney, Agent, or Firm*—Karen F. Clark; Melody A. Jones

(57) ABSTRACT

Dough compositions used to prepare reduced-calorie and low-calorie farinaceous snacks. The snacks made from the dough compositions have a high degree of mouth-melt, less waxiness and increased crispness. The organoleptical improvements are obtained by incorporating a modified starch and/or high amylopectin flour or starch into the dough composition.

13 Claims, No Drawings

DOUGH COMPOSITIONS USED TO PREPARE REDUCED AND LOW-CALORIE SNACKS

CROSS REFERENCE TO RELATED APPLICATIONS

This application claims the benefit of U.S. Provisional Application No. 60/020,934 filed Jul. 1, 1996 and U.S. Provisional Application No. 60/020,937 filed Jul. 1, 1996.

TECHNICAL FIELD

The present invention relates to dough compositions used to prepare reduced-calorie and low-calorie farinaceous snacks. The snacks made from the dough compositions have a high degree of mouth-melt, less waxiness and improved texture. The present invention further relates to a process for making the reduced-calorie and low-calorie snacks.

BACKGROUND OF THE INVENTION

Snacks such as potato chips, corn chips and tortilla chips are particularly popular consumer snack products. In the case of farinaceous snacks, starch-based materials such as potato flakes or granules are reconstituted to form a dough sheet and then pieces are fabricated from the dough sheet. These fabricated pieces are then immersed in a frying fat or oil. When immersed, the fabricated pieces absorb a substantial quantity of the frying fat or oil, typically on the order from about 25% to about 50% by weight of the resulting snack product.

The art discloses farinaceous snacks fried in fat composition comprising non-digestible fats. See, for example, European Patent Application 290,420 to Guffey et al., published Nov. 9, 1988 and U.S. Pat. No. 4,797,300 to Jandacek et al., issued Jan. 10, 1989. The process of frying farinaceous snacks in fat compositions comprising non-digestible fats produces snacks that have significantly increased waxiness impressions. "Waxiness" as used herein relates to how the snack product is sensed in the mouth.

Methods of reducing the waxiness problem associated with snacks fried in compositions comprising non-digestible fats have been recognized and disclosed in the art (see European Patent Application 236,288 to Bernhardt, published Sep. 9, 1986). Representative of these methods include modifying the non-digestible fat composition (see U.S. Pat. No. 5,085,884 to Young, issued Feb. 4, 1992) and combining the non-digestible fat with increasing levels of triglyceride fat (see European Patent Application 233,856 to Bernhardt, published Aug. 26, 1987).

Snacks produced by frying in non-digestible fat are disclosed, in the art, to have a crisp texture and reduced waxiness. However, it has been found that snacks fried in fat compositions comprising non-digestible fats and even modified non-digestible fats do not produce snacks having an acceptable waxiness impression. It has also been found that snacks fried in fat compositions comprising non-digestible fats have slower mouth-melt and are not as crisp as snacks fried in a triglyceride fat composition.

The problems of waxiness, slower mouthmelt and reduced crispness that are characteristic of snacks fried in compositions comprising non-digestible fats are believed to be caused by solids crystallizing in the non-digestible fat that is absorbed by the snack during frying. During frying, the non-digestible fat is absorbed by the snack in a liquefied state. As the snack cools, crystallization of the intermediate-melting and low-melting fats occur, and the solids formed as a result of crystallization alter the organoleptical properties of the snack (e.g., crispness, waxiness impression and mouthmelt). Because these solids are needed in the non-digestible fat composition to prevent passive oil loss, formulation flexibility with regard to the non-digestible frying fat is limited to increasing levels of triglyceride fat, thus offsetting the benefit of calorie reduction.

It would be desirable to be able to produce low-calorie and reduced-calorie snacks having less waxiness and substantially improved texture.

In addition, it would be desirable to have formulation flexibility with regard to the dough compositions used to prepare such reduced-calorie and low-calorie snacks.

Accordingly, it is an object of this invention to provide dough compositions suitable for reduced-calorie and low-calorie farinaceous snacks.

Another object of the present invention is to provide a method of making a sheetable dough used to prepare farinaceous snacks suitable for frying in compositions comprising non-digestible fats.

Still another object of the invention is to provide reduced-calorie and low-calorie farinaceous snacks having improved organoleptical properties (e.g., increased mouthmelt, substantially reduced waxiness impressions and substantially improved crispness).

These and other objects of the invention will become apparent hereafter.

SUMMARY OF THE INVENTION

The present invention relates to dough compositions suitable for frying in fat compositions comprising non-digestible fats and snacks made therefrom. The snacks have a high degree of mouthmelt, less waxiness, improved texture and increased crispiness. These benefits are obtained by incorporating a modified starch and/or a high amylopectin flour or starch into the dough composition and by controlling the water absorption index (WAI) of the starch-based materials present in the dough. The dough compositions comprise:

a) from about 50% to about 70% of a starch-based material comprising,
  i) at least about 3.2% modified starch comprising at least about 3% hydrolyzed starches having a D.E. value of from about 5 to about 30, and wherein any dried modified starches present have a WAI of from about 0.4 to about 8 grams of water per gram of modified starch;
  ii) up to about 96.8% potato flakes having a WAI of from about 6.7 to about 9.5 grams of water per gram of starch;
  iii) provided that if any other starch-containing ingredient is present in the starch-based material other than potato flakes, the other starch-containing ingredient has a WAI below that of the potato flakes; and
b) from about 30% to about 50% added water.

Optionally, the dough compositions can include from about 0.5% to about 6% of an emulsifier.

The fried snacks produced from the dough compositions have from about 0.5% to about 6% moisture and from about 20% to about 38% total fat. The snack products, if fried in fat consisting essentially of non-digestible fat, have a digestible fat content of less than 0.5 gm/30 gram serving.

Surprisingly, the dough compositions of the present invention are capable of reducing the undesirable organoleptical affects associated with frying snacks in compositions comprising non-digestible fats.

The improvements in the organoleptical properties are believed to be due to three factors. One is controlling the WAI of the dough (by controlling the WAI of dry ingredients), which reduces the amount of fat absorbed during frying. Another factor is controlling the rate of moisture release from the dough during frying, which produces a more dense snack structure. The remaining factor is including modified starch and/or a high amylopectin flour or starch in the dough composition which increases the mouthmelt of the snack.

DETAILED DESCRIPTION

Definitions

As used herein "sheetable dough" is a dough capable of being placed on a smooth surface and rolled to the desired final thickness without tearing or forming holes.

As used herein "starch-based materials" refer to naturally occuring, high polymeric carbohydrates composed of glucopyranose units, in either natural, dehydrated (e.g., flakes, granules, meal) or flour form. The starch-based materials include, but are not limited to, potato flour, potato granules, corn flour, masa corn flour, corn grits, corn meal, rice flour, tapioca, buckwheat flour, rice flour, oat flour, bean flour, barley flour, tapioca, as well as modified starches, native starches, and dehydrated starches, starches derived from tubers, legumes and grain, for example cornstarch, wheat starch, rice starch, waxy corn starch, oat starch, cavassa starch, waxy barley, waxy rice starch, glutinous rice starch, sweet rice starch, amioca, potato starch, tapioca starch, cornstarch, oat starch, cassava starch, rice starch, wheat starch, and mixtures thereof.

As used herein "Brabender Units (BU)" is an arbitrary unit of viscosity measurement roughly corresponding to centipoise.

As used herein, "modified starch" refers to starch that has been physically or chemically altered to improve its functional characteristics. Suitable modified starches include, but are not limited to, pregelatinized starches, low viscosity starches (e.g., dextrins, acid-modified starches, oxidized starches, enzyme modified starches), stabilized starches (e.g., starch esters, starch ethers), cross-linked starches, starch sugars (e.g. glucose syrup, dextrose, isoglucose) and starches that have received a combination of treatments (e.g., cross-linking and gelatinization) and mixtures thereof.

As used herein, the term "added water" refers to water which has been added to the dry dough ingredients. Water which is inherently present in the dry dough ingredients, such as in the case of the sources of flour and starches, is not included in the added water.

All percentages are by weight unless otherwise specified.

Starch-based Materials

An important component in the dough compositions of the present invention are the starch-based materials. The doughs of the present invention can comprise from about 50% to about 70%, preferably from about 55% to about 65%, and more preferably about 60% of a starch-based material. The starch-based material can comprise from about 25 to 100% potato flakes with the balance (i.e., from 0 to about 75%) being other starch-containing ingredients such as potato flour, potato granules, corn flour, masa corn flour, corn grits, corn meal, rice flour, tapioca, buckwheat flour, rice flour, oat flour, bean flour, barley flour, tapioca, as well as modified starches, native starches, and dehydrated starches, starches derived from tubers, legumes and grain, for example cornstarch, wheat starch, rice starch, waxy corn starch, oat starch, cavassa starch, waxy barley, waxy rice starch, glutinous rice starch, sweet rice starch, amioca, potato starch, tapioca starch, cornstarch, oat starch, cassava starch, rice starch, wheat starch, and mixtures thereof. The starch-based material preferably comprises from about 40% to about 90%, more preferably from about 50% to about 80%, and even more preferably about 60% to about 70%, potato flakes and from about 10% to about 60%, preferably from about 20% to about 50%, and more preferably from about 30% to about 40%, of these other starch-containing ingredients.

Particularly preferred starch-based materials of the present invention are made from dehydrated potato flakes and potato granules wherein the potato flakes comprise from about 25% to about 95%, preferably from about 35% to about 90%, and more preferably from about 45% to about 80% of the starch-based material, and the potato granules comprise from about 5% to about 75%, preferably from about 10% to about 65%, and more preferably from about 20% to about 55%, of the starch-based material.

Another preferred embodiment can be made using a mixture of potato flakes and potato granules, combined with other starch-containing ingredients that are not potato flakes or granules. Typically, the combined flakes and granules comprise from about 40% to about 90%, preferably from about 50% to about 80%, and more preferably from about 60% to about 70% of the starch-based material, while the other non-potato flake/granule starch-containing ingredients comprise from about 10% to about 70%, preferably from about 20% to about 50%, and more preferably from about 30% to about 40%, of the starch-based materials.

Particularly preferred potato flakes comprise from about 40% to about 60% broken cells, from about 16% to about 27% amylose, from about 5% to about 10% moisture, and at least about 0.1% emulsifier. Additionally, the dehydrated flakes of the present invention have a WAI of from about 6.7 to about 9.5 grams of water per gram of flakes, a hot paste viscosity of from about 100 Brabender Units (BU) to about 320 BU and a cold paste viscosity of from about 100 BU to about 200 BU. From about 40% to about 60% of the dehydrated potato flakes remain on a #40 U.S. screen.

The potato flakes can be prepared by steam peeling raw potatoes and slicing the peeled potatoes to a thickness of from about 0.25 to about 0.75 inches, preferably from about 0.3 to about 0.7 inches and more preferably from about 0.35 to about 0.65 inches (hereinafter referred to as "slabs").

Next the raw potato slabs are cooked under atmospheric pressure using steam typically having a pressure of about 2 to about 20 psig (pounds per square inch gauge). The temperature of the potato slabs rise from about 175° F. (79° C.) to about 212° F. (100° C.) during the first one-third of the cooking cycle, with the temperature remaining at about 212° F. (100° C.) during the remainder of the cooking cycle. The temperature rise from about 175° F. (79° C.) to about 212° F. (100° C.) preferably occurs over a time period of more than about 10 minutes with the total cooking time being at least about 30 minutes. After steam cooking, the potato slabs are riced, dehydrated and comminuted by known methods.

In order to obtain the desired organoleptical properties in the snack product (i.e., crispness, decreased waxiness impression and increased mouthmelt), it is important that the starch-based material comprise at least about 3.2% of a modified starch comprising at least about 3% hydrolyzed starches having a DE of from about 5 to about 30, and wherein any dried modified starches present have a WAI of from about 0.4 to about 8 grams of water per gram of modified starch. It is also important that any potato flakes in the starch-based materials have a WAI of from about 6.7 to about 9.5 grams, preferably from about 7.0 to about 9.0, and more preferably from about 7.7 to about 8.3, grams of water per gram of starch and that any other starch-containing ingredients have a WAI lower than the potato flakes..

The starch-based materials preferably comprise a high amylopectin flour or starch (~at least about 40% amylopectin) selected from the group consisting of waxy corn, waxy barley, waxy rice, glutinous rice, sweet rice, and mixtures thereof. When a high amylopectin flour or starch is used it is preferably present at a level of from about 1% to about 15%, preferably from about 2% to about 10%, and more preferably from about 3% to about 6%, by weight of the starch-based materials.

In order to obtain the desired organoleptical properties of the snack and sheetability of the doughs of the present invention, it is important that the high amylopectin flour have a WAI lower than the flakes or granules used to make the dough composition. Preferred high amylopectin flours are selected from the group consisting of sweet rice flour, waxy rice flour and waxy corn flour. Particularly preferred high amylose starches are available from National Starch and Chemical Corporation, Bridgewater, N.J. and is sold under the trades name of Cereal Crisp™, Amioca™ and Hylon V™ (50% amylose ) and Hylon VII™ (70% amylose).

Modified Starch

An essential ingredient in the dough compositions of the present invention is modified starch. (When calculating the level of modified starch according to the present invention, modified starch (e.g., gelatinized starch) that is inherent in potato flakes or granules and flours is not included.)

At least about 0.2% modified starch selected from the group consisting of pregelatinized starches, cross-linked starches, acid modified starches, and mixtures thereof are needed to increase the crispness of the chip. Preferably, a level of from about 0.2% to about 10%, more preferably from about 1% to about 7%, and even more preferably from about 3% to about 5%, modified starch is used. Particularly preferred modified starches are available from National Starch and Chemical Corporation, Bridgewater, N.J. and are sold under the trade names of N-Lite™ (pregelatinized-crosslinked starch, Ultrasperse-A™ (pregelatinized, waxy corn), N-Creamer™ 46 and Corn PCPF400™. This material is a partially pre-cooked corn meal.

Hydrolyzed starch is also needed in the dough compositions of the present invention. Hydrolyzed starch is important to the processability of the doughs of the present invention which have relatively low water levels. In the absence of hydrolyzed starches, low moisture levels in the dough can prevent formation of a continuous, smooth extensible dough sheet, can hinder subsequent expansion of the dough pieces during frying and can also affect the elasticity of the dough. Although the dough compositions can be sheeted without the inclusion of hydrolyzed starches, the resulting snack product is high in fat and has an undesirable hard, brittle and foamy texture.

Hydrolyzed starches can be included in the dough compositions in an amount of at least about 3%, with a usual range of from about 3% to about 15%. Preferably, hydrolyzed starches are included in an amount of from about 5% to about 12%. Suitable hydrolyzed starches for inclusion in the dough include maltodextrins and corn syrup solids. The hydrolyzed starches for inclusion in the dough have Dextrose Equivalent (D.E.) values of from about 5 to about 30, preferably from about 10 to about 20. Maltrin™ M050, M100, M150, M180, M200, and M250 (available from Grain Processing Corporation, Iowa) are preferred maltodextrins. The D.E. value is a measure of the reducing equivalence of the hydrolyzed starch referenced to dextrose and is expressed as a percentage (on a dry basis). The higher the D.E. value, the higher the dextrose equivalence of the starch.

Water

The dough compositions of the present invention comprise from about 30% to about 50%% added water, preferably from about 22% to about 40%, and more preferably from about 24% to about 35%, added water. The level of water in flours and starches is usually from about 3% to about 8%. However, if the maltodextrin or corn syrup solids are added as a solution or syrup, the water in this syrup or solution is included as "added water". The amount of added water includes any water used to dissolve or disperse ingredients and includes water present in corn syrups, etc.

Emulsifiers

An ingredient that can be added optionally to the dough compositions to aid in the processability of the dough is an emulsifier. The emulsifier works via several mechanisms. The first is as a coating of the flour in the mixer just prior to the addition of the water. This limits the moisture absorption of the flour producing a "short" dough. The second function of the emulsifier is to create a dispersion of fat and moisture droplets throughout the dough. Both of these mechanism tend to limit the adhesiveness of the starch contained in the flour, preventing permanent adhesion to the sheeting rolls.

An emulsifier is preferably added to the dough composition prior to sheeting the dough. The emulsifier can be dissolved in a fat or in a polyol fatty acid polyester, preferably a sucrose fatty acid polyester such as Olean™, available from The Procter and Gamble Company. Suitable emulsifiers include mono- and diglycerides, diacetyl tartaric acid esters and propylene glycol mono- and diesters and polyglycerol. Polyglycerol emulsifiers such as monoesters of polyglycerols, preferably hexapolyglycerols can be used.

Particularly preferred emulsifiers comprise a blend of from about 42.5% to about 90%, preferably from about 50% to about 85%, more preferably from about 60% to about 80%, non-digestible fat with the balance being a mixture of diglyceride, triglyceride, and preferably a monoglyceride wherein the level of monoglyceride is at least about 30%, and is typically from about 30% to about 95%, preferably from about 50% to about 90% wherein the monglyceride has an IV of greater than about 60, preferably an IV between about 70 to about 120, more preferably an IV of from about 80 to about 110, even more preferably an IV of from about 90 to about 100.

Preferably, the mono-glyceride is a distilled monoglyceride having an IV of about 60, derived from, for example, soybean oil, rapeseed oil, cottonseed oil, sunflower seed oil, palm oil, palm olein, safflower oil, corn oil, peanut oil and mixtures thereof. The preferred distilled monoglycerides include but are not limited to monoglycerides derived from, soybean oil, rapeseed and palm oil and mixtures thereof.

Typically commercially available mono-glycerides contain varying amounts of di- and tri-glycerides. For example, distilled monodiglyceride comprise about 90% monoglyceride while monodiglycerides comprise about 30% mono-glycerides. Either can be used in the dough fomulations of the present invention.

The level of emulsifier depends on the amount of work input that the dough will receive in subsequent processing (e.g., extrusion, sheeting) steps. As used herein, the term "emulsifier" refers to an emulsifier which has been added to the dry dough ingredients. Emulsifiers which are inherently present in the dry dough ingredients, such as in the case of the potato flakes, are not included in the term added emulsifier.

Particularly preferred monoglycerides are sold under the trade names of Dimodan® available from Danisco, New Century, Kans. and DMG 70, available from Archer Daniels Midland Company, Decatur, Ill.

The need for higher levels of emulsifier increases as work input increases. Typically, if the doughs are to be sheeted, emulsifiers are added to the dough in an amount of from about 0.5% to about 6% by weight, preferably from about 1.0% to about 5%, more preferably from about 2% to about 4% and more preferably about 3%.

Dough Preparation

The dough of the present invention can be prepared by any suitable method for forming sheetable doughs. For proper hydration and acceptable sheeting however, the lower WAI materials are preferably hydrated prior to the addition of the higher WAI components (i.e., potato flakes and/or granules). The dough compositions of the present invention can be prepared by thoroughly mixing together the flakes, granules, modified starches and optionally an emulsifier. Typically, a water pre-blend of flavoring (optional), modified starches, sucrose and/or salt, and lower WAI starch-based materials are mixed separately. The water pre-blend is then added to the potato flour and/or granules mixture and emulsifier blend and mixed to form a loose, dry dough. Preferred devices for mixing together the dough ingredients are conventional mixers. Hobart® mixers are used for batch operations and Turbolizer® mixers can be used for continuous mixing operations. However, extruders can also be used to mix the dough and to form the sheets or shaped pieces.

Once prepared, the dough is then formed into a relatively flat, thin sheet. Any method suitable for forming such sheets from starch-based doughs can be used. For example, the sheet can be rolled out between two counter rotating cylindrical rollers to obtain a uniform, relatively thin sheet of dough material. Any conventional sheeting, milling and gauging equipment can be used. The mill rolls should be heated to about 90° F. (32° C.) to about 135° F. (57° C.). In a preferred embodiment, the mill rolls are kept at two different temperatures, with the front roller being cooler than the back roller.

Dough compositions of the present invention are usually formed into a sheet having a thickness of from about 0.015 to about 0.10 inches (from about 0.038 to about 0.25 cm), and preferably to a thickness of from about 0.05 to about 0.10 inches (from about 0.013 to about 0.025 cm), and most preferably from about 0.065 to about 0.08 inches (1.65 to 2.03 mm). For rippled (wavy shaped) chips, the preferred thickness is about 0.75 inches (1.9 mm). The dough sheet is then formed into snack pieces of a predetermined size and shape. The snack pieces can be formed using any suitable stamping or cutting equipment. The snack pieces can be formed into a variety of shapes. For example, the snack pieces can be in the shape of ovals, squares, circles, a bowtie, a star wheel, or a pin wheel. The pieces can be scored to make rippled chips as described in published PCT application WO 95/07610, Dawes et al., Jan. 25, 1996, which is incorporated by reference.

After the snack pieces are formed, they are cooked until crisp. The snack pieces can be cooked by frying, partially flying and then baking or by partially baking then frying. The snack pieces can be fried in a fat composition that consists essentially of non-digestible fat, or a blend of non-digestible fat and triglyceride fat.

It is preferred to fry the snack pieces in a fat composition comprising a non-digestible fat at temperatures of from about 275° F. (135° C.) to about 400° F. (204° C.), preferably from about 300° F. (148° C.) to about 375° F. (191° C.), and more preferably from about 315° F. (157° C.) to about 350° F. (177° C.) for a time sufficient to form a product having from about 0.5% to about 6%, preferably from about 1% to about 5%, and more preferably from about 2% to about 4%, moisture. The exact frying time is controlled by the temperature of the frying fat and the starting water content of the dough which can be easily determined by one skilled in the art.

Preferably, the snack pieces are fried in oil using a continuous frying method and are constrained during frying. This constrained frying method and apparatus is described in U.S. Pat. No. 3,626,466 (Liepa, 1971). The shaped, constrained pieces are passed through the frying medium until they are fried to a crisp state with a final moisture content of from about 0.5% to about 4% water, preferably 1% to 2%.

Continuous frying or batch frying of the snack pieces in a non-constrained mode is also acceptable. In this method the pieces are immersed in the frying fat on a moving belt or basket.

The frying can be done in a fat composition consisting essentially of a non-digestible fat, or, if desired, the frying can be done in a mixture of conventional triglyceride oil and a non-digestible fat such as those described in U.S. Pat. No. 3,600,186 to Mattson et al., issued May 12, 1970; U.S. Pat. No. 4,005,195 to Jandacek, issued Jan. 25, 1977; U.S. Pat. No. 4,005,196 to Jandacek et al., issued Jan. 25, 1977; U.S. Pat. No. 4,034,083 to Mattson, issued Jul. 5, 1977; and U.S. Pat. No. 4,241,054 to Volpenhein et al., issued Dec. 23, 1980, all of which are incorporated by reference.

The terms "fat" and "oil" are used interchangeably herein unless otherwise specified. The terms "fat" or "oil" refer to edible fatty substances in a general sense, including natural or synthetic fats and oils consisting essentially of triglycerides, such as, for example soybean oil, corn oil, cottonseed oil, sunflower oil, palm oil, coconut oil, canola oil, fish oil, lard and tallow, which may have been partially or completely hydrogenated or modified otherwise, as well as non-toxic fatty materials having properties similar to triglycerides, herein referred to as non-digestible fats, which materials may be partially or fully indigestible. Reduced calorie fats and edible non-digestible fats, oils or fat substitutes are also included in the term.

The term "non-digestible fat" refers to those edible fatty materials that are partially or totally indigestible, e.g., polyol fatty acid polyesters, such as OLEAN™.

By "polyol" is meant a polyhydric alcohol containing at least 4, preferably from 4 to 11 hydroxyl groups. Polyols include sugars (i.e., monosaccharides, disaccharides, and trisaccharides), sugar alcohols, other sugar derivatives (i.e., alkyl glucosides), polyglycerols such as diglycerol and triglycerol, pentaerythritol, sugar ethers such as sorbitan and polyvinyl alcohols. Specific examples of suitable sugars, sugar alcohols and sugar derivatives include xylose, arabinose, ribose, xylitol, erythritol, glucose, methyl glucoside, mannose, galactose, fructose, sorbitol, maltose, lactose, sucrose, raffinose, and maltotriose.

By "polyol fatty acid polyester" is meant a polyol having at least 4 fatty acid ester groups. Polyol fatty acid esters that contain 3 or less fatty acid ester groups are generally digested in, and the products of digestion are absorbed from, the intestinal tract much in the manner of ordinary triglyceride fats or oils, whereas those polyol fatty acid esters containing 4 or more fatty acid ester groups are substantially non-digestible and consequently non-absorbable by the human body. It is not necessary that all of the hydroxyl groups of the polyol be esterified, but it is preferable that disaccharide molecules contain no more than 3 unesterified hydroxyl groups for the purpose of being non-digestible. Typically, substantially all, e.g., at least about 85%, of the hydroxyl groups of the polyol are esterified. In the case of sucrose polyesters, typically from about 7 to 8 of the hydroxyl groups of the polyol are esterified.

The polyol fatty acid esters typically contain fatty acid radicals typically having at least 4 carbon atoms and up to 26 carbon atoms. These fatty acid radicals can be derived from naturally occurring or synthetic fatty acids. The fatty acid radicals can be saturated or unsaturated, including positional or geometric isomers, e.g., cis- or trans-isomers, and can be the same for all ester groups, or can be mixtures of different fatty acids.

Liquid non-digestible oils can also be used in the practice of the present invention. Liquid non-digestible oils have a complete melting point below about 37° C. include liquid polyol fatty acid polyesters (see Jandacek; U.S. Pat. No. 4,005,195; issued Jan. 25, 1977); liquid esters of tricarballylic acids (see Hamm; U.S. Pat. No. 4,508,746; issued Apr. 2, 1985); liquid diesters of dicarboxylic acids such as derivatives of malonic and succinic acid (see Fulcher; U.S. Pat. No. 4,582,927; issued Apr. 15, 1986); liquid triglycerides of alpha-branched chain carboxylic acids (see Whyte; U.S. Pat. No. 3,579,548; issued May 18, 1971); liquid ethers and ether esters containing the neopentyl moiety (see Minich; U.S. Pat. No. 2,962,419; issued Nov. 29, 1960); liquid fatty polyethers of polyglycerol (See Hunter et al; U.S. Pat. No. 3,932,532; issued Jan. 13, 1976); liquid alkyl glycoside fatty acid polyesters (see Meyer et al; U.S. Pat. No. 4,840,815; issued Jun. 20, 1989); liquid polyesters of two ether linked hydroxypolycarboxylic acids (e.g., citric or isocitric acid) (see Huhn et al; U.S. Pat. No. 4,888,195; issued Dec. 19, 1988); various liquid esterfied alkoxylated polyols including liquid esters of epoxide-extended polyols such as liquid esterified propoxylated glycerins (see White et al; U.S. Pat. No. 4,861,613; issued Aug. 29, 1989; Cooper et al; U.S. Pat. No. 5,399,729; issued Mar. 21, 1995; Mazurek; U.S. Pat. No. 5,589,217; issued Dec. 31, 1996; and Mazurek; U.S. Pat. No. 5,597,605; issued Jan. 28, 1997); liquid esterified ethoxylated sugar and sugar alcohol esters (see Ennis et al; U.S. Pat. No. 5,077,073); liquid esterified ethoxylated alkyl glycosides (see Ennis et al; U.S. Pat. No. 5,059,443, issued Oct. 22, 1991); liquid esterified alkoxylated polysaccharides (see Cooper; U.S. Pat. No. 5,273,772; issued Dec. 28, 1993); liquid linked esterified alkoxylated polyols (see Ferenz; U.S. Pat. No. 5,427,815; issued Jun. 27, 1995 and Ferenz et al; U.S. Pat. No. 5,374,446; issued Dec. 20, 1994); liquid esterfied polyoxyalkylene block copolymers (see Cooper; U.S. Pat. No. 5,308,634; issued May 3, 1994); liquid esterified polyethers containing ring-opened oxolane units (see Cooper; U.S. Pat. No. 5,389,392; issued Feb. 14, 1995); liquid alkoxylated polyglycerol polyesters (see Harris; U.S. Pat. No. 5,399,371; issued Mar. 21, 1995); liquid partially esterified polysaccharides (see White; U.S. Pat. No. 4,959,466; issued Sep. 25, 1990); as well as liquid polydimethyl siloxanes (e.g., Fluid Silicones available from Dow Corning). All of the foregoing patents relating to the liquid nondigestible oil component are incorporated herein by reference. Solid non-digestible fats or other solid materials can be added to the liquid non-digestible oils to prevent passive oil loss. Particularly preferred non-digestible fat compositions include those described in U.S. Pat. No. 5,490,995 issued to Corrigan, 1996, U.S. Pat. No. 5,480,667 issued to Corrigan et al, 1996, U.S. Pat. No. 5,451,416 issued to Johnston et al, 1995 and U.S. Pat. No. 5,422,131 issued to Elsen et al, 1995. U.S. Pat. No. 5,419,925 issued to Seiden et al, 1995 describes mixtures of reduced calorie triglycerides and polyol polyesters that can be used herein but provides more digestible fat than is typically preferred.

The preferred non-digesitible fats are fatty materials having properties similar to triglycerides such as sucrose polyesters. OLEAN™, a preferred non-digestible fat, is made by The Procter and Gamble Company. These preferred non-digestible fat are described in Young; et al., U.S. Pat. No. 5,085,884, issued Feb. 4, 1992, and U.S. Pat. No. 5,422,131, issued Jun. 6, 1995 to Elsen et al.

Other ingredients known in the art can also be added to the edible fats and oils, including antioxidants such as TBHQ, ascorbic acid, chelating agents such as citric acid, and anti-foaming agents such as dimethylpolysiloxane.

The snack products made from this process typically have from about 19% to about 38%, preferably from about 20% to about 35%, and more preferably from about 23% to about 32% total fat (i.e., combined non-digestible and digestible fat). If a higher fat level is desired in the snack product to further improve the lubricity of the snack, a triglyceride oil can be sprayed onto the snack product when it emerges from the fryer, or when it is removed from the mold used in constrained frying. Preferably, the triglyceride oils for spraying will have an iodine value greater than 75, and most preferably above 90. Triglyceride oils with characteristic flavor or highly unsaturated oils can be sprayed onto the snack product. Preferably triglyceride oils and non-digestible fats are used as a carrier to disperse flavors and added topically to the snack product. with added flavors can also be used. These include butter flavored oils, natural or artificial flavored oils, herb oils and oils with garlic or onion flavors added. This allows the introduction of a variety of flavors without having the flavor undergo browning reactions during the frying. It also avoids adding the flavor to the dough and having the flavor react with or leach into the oil during the frying process. This method can be used to introduce healthier oils which would ordinarily undergo polymerization or oxidation during the heating necessary to fry the snacks.

Triglyceride oils spray can be applied to the snack product after baking or frying. The triglyceride oil can be used to increase the fat content of the snack to as high as 44% total fat. Thus a snack product having various fat contents can be made using this additional step.

Analytical Methods

Water Absorption Index (WAI)

In general, the "Water Absorption Index" and "WAI" refers to the measurement of the water holding capacity of any carbohydrate based material as a result of a cooking process. (See for example Anderson, R. A., Conway, H. F., Pfeifer, V. F. and Griffin, Jr., E. L., 1969, *Gelatinization of Corn Grits By Roll -and Extrusion-Cooking*. Cereal Science Today; 14(1):4). The cooking and dehydration of potato flakes introduces changes in the potato cell physiology which affects its rehydration properties, specifically its water holding capacity. This measurement is typically expressed as the ratio of mass of water held per unit mass of material. The WAI for a sample is determined by the following procedure. The weight to two decimal places of an empty centrifuge tube is determined. Two grams of dry sample (e.g., potato flakes) are placed into the tube. Thirty milliliters of water is added to the tube. The water and sample are stirred vigorously to insure no dry lumps remain. The tube is placed in a 30° C. (85° F.) water bath for 30 minutes, repeating the stirring procedure at 10 and 20 minutes. The tube is then centrifuged for 15 minutes at 3,000 RPM. The water is then decanted from the tube, leaving a gel behind. The tube and contents are weighed. The WAI is calculated by dividing the weight of the resulting gel by the weight of the dry sample (i.e., [weight of tube and gel]–[weight of tube]÷[weight of dry flakes]).

The embodiments of the present invention are illustrated by the following examples.

EXAMPLE 1

The following composition is used to make fabricated potato chips. The dough composition comprises 30% water (based on the total dough composition) and 70% of the following mixture of ingredients:

| Ingredient | Wt. % |
| --- | --- |
| Potato flakes | 75 |
| Wheat Starch | 9 |
| Corn Meal | 9 |
| *N-Lite LP ™ | 3 |
| Malto-dextrin | 4 |

*Available from the National Starch and Chemical Company, Bridgewater, NJ.

The wheat starch and corn meal are blended in a Turbulizer® mixer. The maltodextrin is dissolved in the water and added to the blend. The blend is mixed with potato flakes to form a loose, dry dough.

The dough is sheeted by continuously feeding it through a pair of sheeting rolls forming an elastic continuous sheet without pin holes. Sheet thickness is controlled to 0.02 inches (0.05 cm).

The dough sheet is then cut into oval shaped pieces and fried in a constrained frying mold at 375° F. for about 12 seconds. The frying fat is a blend of cottonseed oil, corn oil and Olean™ (available from the Procter & Gamble Company). The fried pieces contain about 38% fat.

EXAMPLE 2

The following composition is used to make fabricated potato chips. The dough composition comprises 35% water (based on the total dough composition), 5% of an emulsifier, and 65% of the following mixture of ingredients:

| Ingredient | Wt. % |
| --- | --- |
| Potato flakes (WAI 8.5) | 79.5 |
| Potato granules (WAI 4.0) | 9.0 |
| Sweet Rice Flour (WAI 2.2) | 6.0 |
| Maltodextrin DE 18 | 4.0 |
| N-Lite LP ™ (WAI 0.7) | 1.5 |

A mix consisting of the dry ingredients, water and emulsifier are blended in a Turbolizer® to form a loose, dry dough (~15–60 seconds). The dough is sheeted by continuously feeding it through a pair of sheeting rolls forming an elastic continuous sheet without pin holes. Sheet thickness is controlled to 0.02 inches (0.05 cm). The front roll is heated to about 90° F. (32° C.) and the back roll is heated to about 135° F. (57° C.). The dough sheet is then cut into oval shaped pieces and fried in a constrained frying mold at 385° F. (196° C.) in Vitamin E enriched OLEAN™ (made by The Procter and Gamble Company) for about 12 seconds. The product is held in the molds for about 20 seconds to allow the OLEAN™ to drain. The resulting product has a crisp texture. The chip is fortified by spraying with an OLEAN™ vitamin suspension containing vitamin A, D and K while the chips are still hot. The non-digestible fat level is about 30%. The digestible fat level from the emulsifier is less than 0.5 grams/30 gram serving.

EXAMPLE 3

The following composition is used to make fabricated potato chips. The dough composition comprises 35% water (based on the total dough composition), 5% emulsifier, and 65% of the following mixture of ingredients:

| Ingredient | Wt. % |
| --- | --- |
| Potato flakes (8.5) | 72.8 |
| Potato granules (4.0) | 8.2 |
| Cereal Crisp (6.9) | 4.0 |
| Maltodextrin DE 18 | 4.0 |
| N-Creamer 46 ™ (1.7) | 1.0 |

EXAMPLE 4

The following composition is used to make fabricated potato chips. The dough composition comprises 35% water (based on the total dough composition), 5% emulsifier, and 65% of the following mixture of ingredients:

| Ingredient | Wt. |
| --- | --- |
| Potato flakes (8.5) | 82 |
| Ultra-Sperse ™ (3.7) | 4.0 |
| Maltodextrin DE 1 8 | 4.0 |
| Potato Granules (4.0) | 9.0 |
| N-Creamer 46 ™ (1.7) | 1.0 |

EXAMPLE 5

The following composition is used to make fabricated potato chips. The dough composition comprises 35% water (based on the total dough composition), 5% emulsifier, and 65% of the following mixture of ingredients:

| Ingredient | Wt. |
| --- | --- |
| Potato flakes (8.5) | 82 |
| Ultra-Sperse ™ (3.7) | 4.0 |
| Maltodextrin DE 18 | 4.0 |
| Corn Flour (4.0) | 9.0 |
| N-Creamer 46 ™ (1.7) | 1.0 |

EXAMPLE 6

The following composition is used to make fabricated potato chips. The dough composition comprises 35% water (based on the total dough composition), 5% emulsifier, and 65% of the following mixture of ingredients:

| Ingredient | Wt. % |
| --- | --- |
| Potato flakes (8.5) | 82.4 |
| Potato Granules (4.0) | 9.2 |
| Soft Wheat Flour (1.7) | 3.4 |
| Maltodextrin DE 18 | 4.0 |
| N-Creamer 46 ™ (1.9) | 1.0 |

What is claimed is:

1. A dough composition comprising:
   a) from about 50% to about 70% of a starch-based material comprising,
      i) at least about 0.2% dried modified starch having a WAI of from about 0.4 to about 8 grams of water per gram of modified starch;
      ii) at least about 3% hydrolyzed starch having a D.E. value of from about 5 to about 30;
      iii) up to about 96.8% potato flakes having a WAI of from about 6.7 to about 9.5 grams of water per gram of starch;
      iv) optionally, potato granules;
      v) high amylopectin flour or starch having a WAI lower than the flakes or granules used;
      vi) provided that if any other starch-containing ingredient is present in the starch-based material other than potato flakes, the other starch-containing ingredient has a WAI below that of the potato flakes; and
   b) from about 30% to about 50% added water.

2. The dough composition of claim 1 further comprising from about 0.1% to about 6% of an emulsifier.

3. The dough composition of claim 1 wherein the starch-based material comprises from about 25% to about 96.8% potato flakes.

4. The dough composition of claim 3 wherein the starch based material comprises:
   (a) from about 40% to about 80% potato flakes;
   (b) from about 5% to about 25% potato granules;
   (c) from about 2% to about 10% of a high amylopectin flour or starch;
   (d) from about 0.2% to about 10% of a modified starch;
   (e) from about 3% to about 15% hydrolyzed starch having a DE of from about 5 to about 30; and
   (f) from about 0.1% to about 6% emulsifier.

5. The dough composition of claim 4 wherein the high amylopectin flour or starch is selected from the group consisting of waxy corn, waxy rice, sweet rice and mixtures thereof.

6. The dough composition of claim 5 wherein the modified starch is a pre-gelatinized cross-linked starch.

7. A dough sheet formed from the dough composition of claim 6.

8. A fabricated chip made from the dough sheet of claim 7.

9. The fabricated chip of claim 8 wherein the chip is fried in a fat selected from the group consisting of non-digestible fats and blends of non-digestible fats and triglyceride fats.

10. The fabricated chip of claim 9 wherein the fat is a non-digestible fat.

11. A process for making a snack comprising the steps of:
    (a) forming a dough from the dough composition of claim 6;
    (b) forming a sheet from the dough;
    (c) cutting snack pieces from the sheet; and
    (d) frying the snack pieces in a fat selected from the group consisting of non-digestible fats and blends of non-digestible fats and triglyceride fats.

12. The process of claim 11 wherein the dough is formed into a sheet having a thickness of from about 0.015 inches to about 0.10 inches (from about 0.038 to about 0.25 cm).

13. The process of claim 12 wherein the fat is a non-digestible fat.

* * * * *